United States Patent [19]
Dabanian

[11] 4,047,433
[45] Sept. 13, 1977

[54] MODULAR VORTEX FLOWMETER

[75] Inventor: Karnig H. Dabanian, Taylor, Mich.

[73] Assignee: Cox Instrument Division Lynch Corporation, Detroit, Mich.

[21] Appl. No.: 684,416

[22] Filed: May 7, 1976

[51] Int. Cl.² .......................... G01F 1/06; G01F 1/32
[52] U.S. Cl. ..................................... 73/194 C; 73/229
[58] Field of Search ............................. 73/194 C, 229

[56] References Cited

U.S. PATENT DOCUMENTS

| 2,346,864 | 4/1944 | Packard | 73/229 |
| 3,360,989 | 1/1968 | Herrington | 73/229 |
| 3,867,840 | 2/1975 | Baatz | 73/229 |
| 3,937,081 | 2/1976 | Dabanian et al. | 73/194 |

FOREIGN PATENT DOCUMENTS

| 839,905 | 6/1960 | United Kingdom | 73/229 |

*Primary Examiner*—Herbert Goldstein
*Attorney, Agent, or Firm*—Harness, Dickey & Pierce

[57] ABSTRACT

A vortex type flowmeter having a body member, a cover member and an interior varying diameter cavity formed in the body member in which fluid is introduced to flow in a generally helical pattern within the cavity, the fluid being introduced at the periphery of the cavity having the largest diameter and the fluid exiting from an aperture at the center of the vortex formed by the helical flow. The flowmeter includes a toothed rotor mounted for rotation within the cavity and the flow of fluid causes the rotor to rotate within the cavity at a rotational rate which is generally directly related to the velocity of flow. The flowmeter is provided with a light-emitting diode and photosensitive transistor combination which senses the passage of each of the teeth as the rotor is rotating within the cavity. This combination is formed as a unitary assembly, a portion of which nests a portion of the rotor. The unitary assembly further includes spoiler means which takes the same general configuration as the rotor, the spoiler means being mounted closely adjacent and parallel to the rotor to cause shear drag on the rotor at high flow rates to improve the down side response time of the rotor after the flow of fluid has been decreased. In this way the linearity of the assembly is enhanced.

13 Claims, 6 Drawing Figures

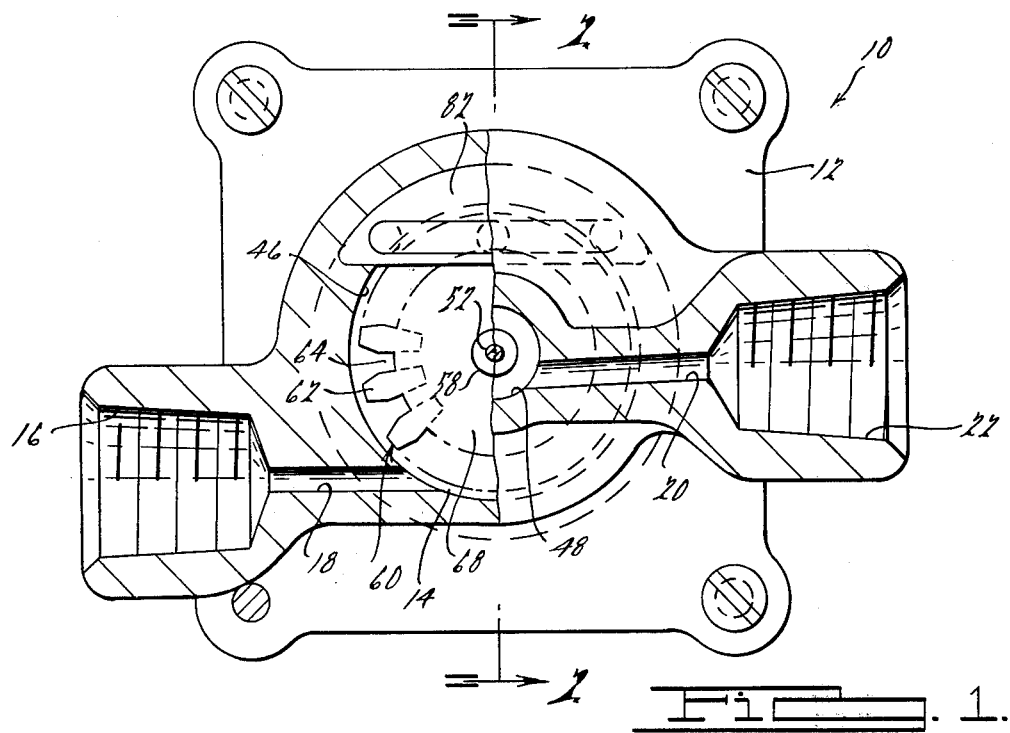
FIG. 1.
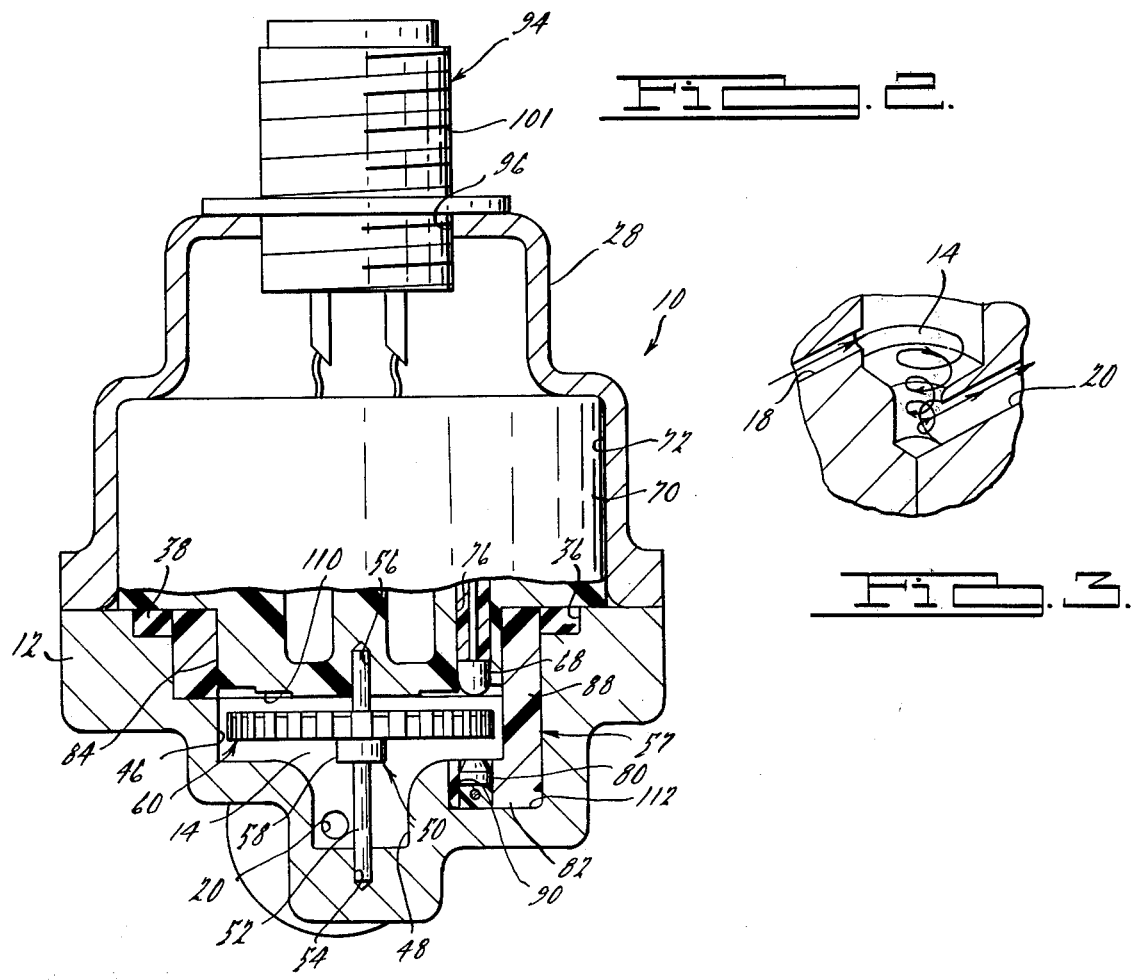
FIG. 2.
FIG. 3.

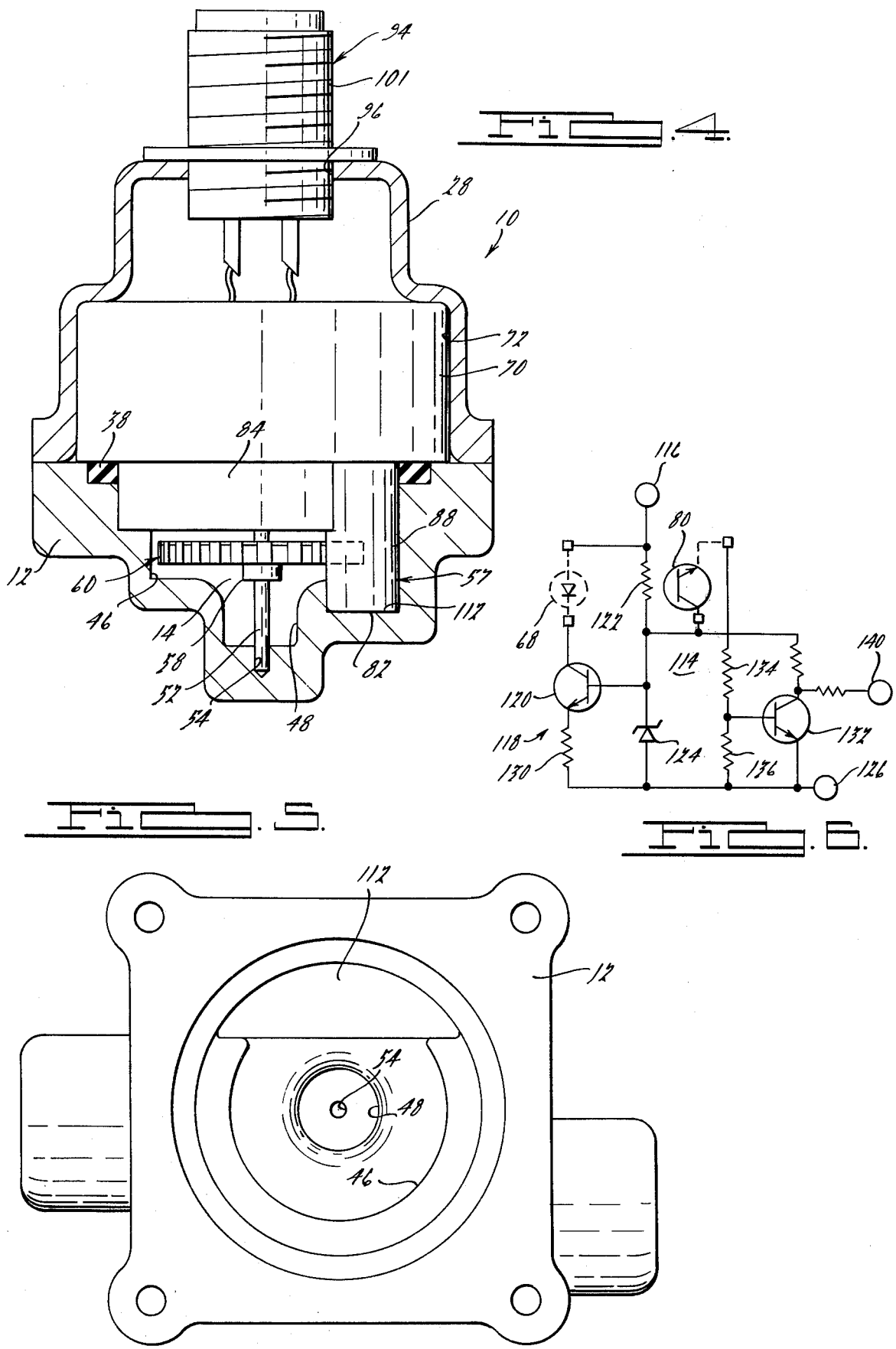

MODULAR VORTEX FLOWMETER

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BACKGROUND AND SUMMARY OF THE DEVELOPMENT

This invention relates generally to a vortex type flowmeter and more particularly to a vortex flowmeter having a photoelectric, rotor-velocity modular sensing system and a spoiler system to improve the down side response time of the meter assembly.

A vortex flowmeter generally consists of a confined, generally inverted frustro-conical vortex chamber with a tangential inlet to the vortex chamber and a central outlet. The vortex causes fluid flowing into the chamber to swirl in a generally helical fashion toward the outlet conduit to cause the fluid to increase in velocity as the diameter of the flow path is decreased. Thus, a vortex flowmeter has the tendency to increase the velocity of the fluid through the meter as it is being measured. Typically, a moveable unit is provided in the chamber, which unit is acted on by the fluid in the chamber. A measuring system is provided to sense the movement of the movable unit.

In prior flowmeters, such as is disclosed in a patent to Dabanian, et al., U.S. Pat. No. 3,937,081, issued Feb. 10, 1976, for Vortex Flowmeter, the light emitting diode is mounted within one of the cover members while the phototransistor is mounted in the other cover member, these members forming the vortex chamber described above. With this system, certain manufacturing operations are required to form the mounting apertures within the cover members. Also, the conductors from one of the diode or phototransistor must be led from one cover member to the other to provide a single-side electrical connection to the external display circuitry.

With the system of the present invention, it is contemplated that the interior vortex cavity is provided with a toothed rotor and a light-emitting diode-phototransistor modular sensing arrangement whereby the diode-phototransistor sensing system, with the associated circuit elements, are mounted in a module which is easily removed from the body cavity for replacement. Also, the phototransistor, light-emitting diode and circuit elements are potted within the module to insure that fluid or other contaminant does not contact the circuitry.

Accordingly, it is one object of the present invention to provide an improved vortex flowmeter.

It is another object of the present invention to provide an improved vortex flowmeter having an improved rotor rotation sensing arrangement.

It is a further object of the present invention to provide an improved vortex flowmeter having an improved rotor mounting arrangement.

It is a further object of the present invention to provide an improved vortex flowmeter having a modular light-emitting diode and phototransistor arrangement which is easily removed for replacement.

It is a further object of the present invention to provide an improved rotor rotation sensing arrangement which is inexpensive to manufacture and reliable in use.

Further objects, features and advantages of this invention will become apparent from a consideration of the following description, the appended claims and the accompanying drawings in which:

FIG. 1 is an end view, in section, of a flowmeter incorporating certain features of the present invention;

FIG. 2 is a cross-sectional view of FIG. 1 taken along line 2—2 thereof;

FIG. 3 is a perspective schematic view illustrating the principle of a vortex flowmeter;

FIG. 4 is a cross-sectional view of the flowmeter of FIG. 2 with the modular sensing assembly and rotor in full line;

FIG. 5 is an end view of the flowmeter of FIG. 1 in full line; and

FIG. 6 is a schematic diagram illustrating one preferred pickup system and amplifier circuit which is adapted to be utilized in conjunction with the flowmeters of FIGS. 1 to 5.

Referring now to FIGS. 1 and 2, there is illustrated a flowmeter assembly 10 which incorporates the features of the present invention. The flowmeter 10 basically includes a body member 12 which may be cast or otherwise formed to provide a vortex flow chamber 14, the vortex flow chamber being provided with a tangential flow of fluid at the greatest diameter thereof by means of an inlet port 16 and an inlet passageway 18. The outlet for the chamber 14 is provided at the least diameter portion of the vortex chamber 14, an outlet passageway 20 being concentrically located within the chamber 14 and being in fluid connection with an output port 22. As is seen from FIGS. 1 and 3, the outlet passageway 20 is substantially tangential to the small diameter portion of the chamber 14.

Referring to FIG. 2, it is seen that the assembly 10 is illustrated in cross section wherein the body portion 12 is illustrated as forming the cavity 14, the cavity being closed by a cover member 28. The body portion 12 is formed with a countersunk annular groove 36, the groove being adapted to receive an O-ring 38 to provide a seal for the interior cavity of the body 12.

FIG. 3 best illustrates the flow of fluid from the entry port 16 to the exit port 22 via the passageways 18 and 20. As is seen from FIG. 1, the interior portion of the interior wall of passageway 18 enters the cavity 14 substantially along a tangent to the largest diameter of the cavity 14. In this way, a tangential flow of fluid is introduced into the vortex cavity at the largest diameter thereof. Fluid introduced at inlet 16 flows along the wall 46 of the largest diameter portion to form a swirling action, the vortex of the swirl being concentric with a small diameter portion 48. The exit passageway 20 is positioned as illustrated in FIG. 1 so that the fluid is drawn from the cavity 14 at the center of the vortex.

FIG. 3 illustrates the flow of fluid in schematic form wherein fluid is introduced at the inlet passageway 18, flows in the vortex chamber 14 and is exited at the exit passageway 20. From the schematic drawings it is seen that a vortex is formed, the diameter of the swirling fluid decreasing as the fluid flows from the inlet to the outlet ports. In accordance with common fluid dynamic principles, the fluid velocity as it enters the passageway 18 multiplied by the radius from the center of the vortex, is equal to the fluid velocity as it is exited from the vortex chamber multiplied by the radius of the fluid from the center of the vortex. Thus, the fluid increases in velocity as the diameter of the fluid flow from the center of the vortex decreases.

The swirling fluid reacts with a rotor assembly 50, the rotor assembly including a shaft 52 which is journalled in an aperture 54 in the body portion 12 and an aperture 56 in a phototransistor-diode sensing assembly 57. The rotor assembly includes a bearing assembly 58, the inner race of which is journalled on the shaft 52 and the outer race of which is journalled on an interior aperture of a rotor member 60. Thus, the rotor 60 is adapted to rotate relative to the shaft 52 in response to the interaction between the rotor 60 and the swirling fluid introduced into input port 16.

The rotor 60 is formed generally of a flat disc with a plurality of teeth 62 formed therein, the teeth being formed with a central root 64 for each adjacent pair of teeth. The rotor also includes a plate portion 68 which does not extend to the outer periphery of the teeth 62. Thus, a groove is formed between adjacent teeth which extends from the tip of the tooth to a distance approximately one-quarter to one-third of the radius of the rotor. Also, a portion of the tooth is formed on one face of the integral plate 68. Thus, the teeth on one face of the rotor element 60 extend from approximately one-fourth of the distance from the shaft 52 toward the outer diameter of the rotor 60 to the extreme outer diameter of the rotor 60. At the extreme outer edge of the rotor 60, the teeth extend completely through the rotor body.

As described above, the movement of the rotor is sensed by means of a light-emitting diode and phototransistor arrangement 57, the phototransistor and light-emitting diode arrangement being separated, one from the other, across the space defined by the large diameter portion 46 and the vortex cavity 14. The rotor 60 is adapted to rotate in this space, the through portion of the rotor teeth forming a light path between the light-emitting diode and phototransistor assembly 57 through the fluid swirling within the cavity 14.

Specifically, a light-emitting diode 68 is mounted within a main sensor body 70, the body 70 being positioned within a large diameter cavity 72 formed in the cover 28. A potting compound (not shown) closes the upper portion of the sensor body 70 which is formed as a hollow cup to support the circuitry illustrated in FIG. 6. The light-emitting diode 68 is adapted to shine light through the hole 72 formed in the body 70. This directs light across the gap formed by the large diameter portion 46 to be sensed by a phototransistor element 80. The phototransistor 80 is similarly mounted within a sleeve 82 press-fitted on the exterior surface 84 formed on the body 70. Again, a potting compound is utilized to seal the phototransistor 80 within the sleeve 82. The leads from the phototransistor are positioned in a leg portion 88 and are connected to the circuitry (FIG. 6) contained in the cup portion of sensor body 70.

It will be seen from an inspection of FIG. 2, the light emitted by diode 68 shines across the large diameter portion 46 into a small aperture 90 formed in the sleeve 82 to be received by the phototransistor 80. The rotor element 60, positioned between the light-emitting diode 68 and phototransistor 80, will chop the light being transmitted through the fluid swirling within the cavity 14. In this way, the phototransistor 80 is periodically energized to cause conduction of the phototransistor 80 in response to the chopped light generated across the gap 46. It is to be noted that the frequency of the energization of phototransistor 80 will be directly related to the number of times that a tooth of the rotor 60 passes within the gap formed by large diameter portion 46. As will be seen from a description of FIG. 6, this energization of the phototransistor 80 will be translated into a series of pulses for use by a frequency responsive meter.

Referring particularly to FIGS. 2 and 4, it is seen that the leads from the circuit of FIG. 6 are directed to a connector assembly 94 through an aperture 96 formed in the cover member 28.

The connector assembly 94 includes a mechanical male connector 101 which is adapted to connect to a suitable female connector (not shown). As is typical, the connector 101 includes a plurality of pins which are adapted to be connected to the leads associated with the circuit of FIG. 6.

As was stated above, the rotor 60 is mounted on bearing elements 58 and has a tendency to coast after the supply of fluid is cut off from the flowmeter assembly. Thus, the down side linearity of the flowmeter is greatly affected by the viscosity of the fluid, the flow rate at which the fluid is being admitted to the flowmeter before being cut off, and the degree of reduction of flow to the flowmeter. In order to enhance the linearity of the flowmeter on the down side, a spoiler means 110 has been provided to decrease the coasting effect of the rotor after the flow of fluid to the flowmeter has been reduced. This spoiler 110 has been selected, in the case of the instant invention, to be a structure which is identical in configuration to the rotor 60 but slightly thinner in cross section. This spoiler 110 is molded in the lower face of the sensor body 70 and parallel to and concentric with the rotor element 60. The teeth of the spoiler 110 are again identical to the teeth formed in upper side of the rotor element 60.

As was stated above, the spoiler 110 creates a shear drag force on the rotor with the swirling fluid within the cavity 14. When the flow of fluid is reduced to the cavity, the fluid trapped within the teeth of the spoiler 110 creates the drag force which reacts with the upper face of the rotor 60 to cause the rotor 60 to follow a coasting curve which is greatly reduced in duration as the rotor approaches a speed very nearly that of the swirling fluid.

The portion of the rotor 60 facing away from the shear drag element 110 is illustrated as being a relatively flat plate to reduce the amount of drag created and thereby enhance the ability of the fluid to accelerate the rotor when the flow of fluid is being increased either from zero or to a flow to be measured or from a lower flow to a higher flow. The spacing between the shear element 110 and the rotor 60 is selected to be a compromise between the ability of the fluid to accelerate the rotor upon an increase in fluid flow and the ability of the rotor to follow the flow of fluid on the down side as the flow is being reduced. Obviously, the configuration of the shear drag element 110, or the rotor 60, may be changed to produce different configurations for the spoiler element 110 or the rotor 60. However, with the preferred configuration illustrated, a reduction in cost of the unit is provided due to the fact that similar elements may be produced from the same die. For further details of the rotor and drag element, reference is made to the above referenced Dabanian, et al. patent.

Referring to the body portion as best illustrated in FIGS. 2 and 5, it is seen that the small diameter portion 48 is contiguous with the passageway 20. Also, the body 12 is cast with a cavity 112 which is adapted to receive and stabilize the lower portion of leg 88 of element 57.

In this way, the body portion 70 and sleeve 57 are rigidly positional within the cavity 14, the body 12 and the cover 28.

Referring now to FIG. 6, there is illustrated a preferred circuit 114 for translating the movement of the rotor between the light-emitting diode 68 and the phototransistor 80 to a series of pulses which may be fed to a frequency meter or like pulse measuring device. Specifically, the circuit 114 includes the light-emitting diode 68 which is fed from a positive source of potential at input terminal 116, the terminal being fed a source voltage. The current through the light-emitting diode 68 is controlled by means of a constant current circuit 118 which includes a bias circuit for a transistor 120, the bias circuit including a current limiting resistor 122 and a zener diode 124. The zener diode 124 is connected between the base electrode of the transistor 120 and a common electrode 126. The collector-emitter circuit of the transistor 120 also includes a resistor 130. Thus, the voltage at input terminal 116 causes the zener diode 124 to avalanche thereby feeding a precise base-emitter bias voltage to the transistor 120. This will cause the transistor 120 to conduct at a constant current level.

This constant current is fed through the light-emitting diode 68, the light-emitting diode 68 being positioned in proximity to the phototransistor 80 as particularly illustrated in FIG. 2. As described in connection with the description of FIG. 2, the rotor blades 62 pass between the light-emitting diode 68 and the phototransistor 80 to chop the flow of light between light-emitting diode 68 and transistor 80. This causes the transistor 80 to intermittently conduct in synchronism with the passage of the space between two teeth.

The conduction of transistor 80 causes a transistor 132 to conduct due to the connection of the transistor 80 between the positive source of potential at terminal 116 and a base-emitter biasing circuit including resistors 134, 136. When the transistor 80 conducts, a voltage will be developed across resistor 136 to cause transistor 132 to conduct. The conduction of transistor 132 will cause the voltage at an output terminal 140 to drop to very nearly the potential at the common terminal 126. Thus, the output terminal will provide negative going pulses each time that the transistor 132 conducts.

While specific configuration of elements and materials and dimensions have been illustrated, it is to be understood that many modifications and variations to the device and circuitry disclosed may be made. For example, the body member 12 may be molded from a non-metallic material and the reduced diameter portion may be formed in a generally frusto-conical shape to provide a linear transition of diameters from the largest to the smallest diameter of the cavity 14. These modifications may be made within the keeping of the spirit of the invention.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A vortex flowmeter comprising a body structure having a cavity formed therein, cover means fastened contiguous to said body structure for closing said cavity, inlet port means positioned generally tangentially to one portion of said cavity and outlet port means positioned adjacent another portion of said cavity for permitting the flow of fluid through said cavity from said inlet port means to said outlet port means, said body structure including a first shaft mounting means, a shaft mounted at one end thereof in said mounting means and extending centrally through said cavity, a rotor mounted on said shaft and positioned in said cavity and having a plurality of teeth formed thereon, and a modular sensing assembly positioned to sense the passage of said teeth in response to the flow of fluid in said cavity including a second shaft mounting means for mounting the other end of said shaft, said sensing assembly being mounted in said cavity and comprising a light-emitting diode, a phototransistor mounted remote from said light-emitting diode, and sensor housing means and sleeve means forming an integral unit for mounting said light-emitting diode and phototransistor in spaced relation, at least a portion of said rotor being positioned between a portion of said sensor housing means and a portion of said sleeve means for rotation therebetween, one of said phototransistor and said light-emitting diode being mounted in said portion of said sensor housing means and the other of said phototransistor and said light-emitting diode being mounted in said portion of said sleeve means, said sensor sleeve means including projecting means formed to project along an axis generally parallel to the axis of said housing means, said portion of said sleeve means extending radially from said projecting means adjacent said rotor, said sensor housing means and said sleeve means being formed as separate elements, said housing means and sleeve means being fastened, one to the other, said sensor housing means being formed as a cup shaped element having a projection therefrom, said sleeve means including fastening means fastened to said projection, said projection is formed as a cylinder, said fastening means including an annulus surrounding said cylinder.

2. The flowmeter of claim 1 wherein said cylinder and said annulus are press-fitted together.

3. The flowmeter of claim 2 further including spoiler means positioned adjacent said rotor and in fluid coupling therewith, said coupling creating a shear drag on said rotor to improve the down side response time of said rotor.

4. The flowmeter of claim 3 wherein said spoiler means includes teeth formed therein to receive fluid from said inlet port, said teeth trapping fluid therebetween.

5. The flowmeter of claim 4 wherein said trapped fluid creates a static condition for said fluid, said static fluid reacting with other fluid between said rotor and spoiler means to slow the rotor down in a lesser period of time when the flow of fluid is reduced at said inlet port.

6. The flowmeter of claim 5 wherein said spoiler means is positioned on said sensor housing means adjacent said rotor.

7. The flowmeter of claim 6 wherein said spoiler means is integrally formed on the face of said housing means parallel to said rotor.

8. The flowmeter of claim 7 further including circuit means in said cup portion of said cup shaped housing, the leads from said other of said phototransistor and said light-emitting diode being positioned in said projecting means.

9. The flowmeter of claim 8 further including potting means to close said cup shaped portion.

10. A vortex flowmeter comprising a body structure having a cavity formed therein, cover means fastened contiguous to said body structure for closing said cavity, inlet port means positioned generally tangentially to one portion of said cavity and outlet port means positioned adjacent another portion of said cavity for permitting the flow of fluid through said cavity from said inlet port means to said outlet port means, said body structure including a first bearing shaft mounting means, a shaft mounted at one end thereof in said mounting means and extending centrally through said cavity, a rotor mounted on said shaft and positioned in said cavity and having a plurality of teeth formed thereon, and a modular sensing assembly positioned to sense the passage of said teeth in response to the flow of fluid in said cavity including a second shaft mounting means for mounting the other end of said shaft, said sensing assembly being mounted in said cavity and comprising a light-emitting diode, a phototransistor mounted remote from said light-emitting diode, and sensor housing means and sleeve means forming an integral unit for mounting said light-emitting diode and phototransistor in spaced relation, at least a portion of said rotor being positioned between a portion of said sensor housing means and a portion of said sleeve means for rotation therebetween, one of said phototransistor and said light-emitting diode being mounted in said portion of said sensor housing means and the other of said phototransistor and said light-emitting diode being mounted in said portion of said sleeve means, spoiler means positioned adjacent said rotor and in fluid coupling therewith, said coupling creating a shear drag on said rotor to improve the down side response time of said rotor, said spoiler means including teeth formed therein to receive fluid from said inlet port, said teeth trapping trapped fluid therebetween, said trapped fluid reacting with other fluid between said rotor and spoiler means to slow the rotor down in a lesser period of time when the flow of fluid is reduced at said inlet port, said spoiler means being positioned on said sensor housing means adjacent said rotor and being integrally formed on the face of said sensor housing means parallel to said rotor.

11. The flowmeter of claim 10 further including circuit means in said cup portion of said cup shaped housing, the leads from said other of said phototransistor and said light-emitting diode being positioned in said projecting means.

12. The flowmeter of claim 11 wherein said circuit means includes a voltage source for said phototransistor and said light emitting diode.

13. A vortex flowmeter comprising a body structure having a cavity formed therein, cover means fastened contiguous to said body structure for closing said cavity, inlet port means positioned generally tangentially to one portion of said cavity and outlet port means positioned adjacent another portion of said cavity for permitting the flow of fluid through said cavity from said inlet port means to said outlet port means, said body structure including a first bearing shaft mounting means, a shaft mounted at one end thereof in said mounting means and extending centrally through said cavity, a rotor mounted on said shaft and positioned in said cavity and having a plurality of teeth formed thereon, and a modular sensing assembly positioned to sense the passage of said teeth in response to the flow of fluid in said cavity including a second shaft mounting means for mounting the other end of said shaft, said sensing assembly being mounted in said cavity and comprising a light-emitting diode, a phototransistor mounted remote from said light-emitting diode, and sensor housing means and sleeve means forming an integral unit for mounting said light-emitting diode and phototransistor in spaced relation, at least a portion of said rotor being positioned between a portion of said sensor housing means and a portion of said sleeve means for rotation therebetween, one of said phototransistor and said light-emitting diode being mounted on said portion of said sensor housing means and the other of said phototransistor and said light-emitting diode being mounted in said portion of said sleeve means, said sensor housing means and said sleeve means being formed as separate elements and being permanently fastened, one to the other, said sensor sleeve means including projecting means formed to project along an axis generally parallel to the axis of said housing means, said portion of said sleeve means extending radially from said projecting means adjacent said rotor whereby a notch is defined for receiving said portion of said rotor, said light-emitting diode and said phototransistor being sealed within the associated ones of said portions of said sleeve means and said sensor housing means.

* * * * *